Patented Dec. 4, 1945

2,390,446

UNITED STATES PATENT OFFICE 2,390,446

VULCANIZATES OF FURYLETHYLENE POLYMERS

Charles J. Mighton, Wilmington, Del., assignor to E. I. du Pont de Nemours & Company, Wilmington, Del., a corporation of Delaware No Drawing. Application October 14, 1942, Serial No. 461,995

8 Claims. (Cl. 260—36)

This invention relates to polymers of furylethylene (2-vinylfurane) and more particularly to vulcanizates of furylethylene polymers.

One object of the present invention is to provide improved compositions comprising polymers, including copolymers, of furylethylene. A further object is to provide a new and valuable class of polymeric materials. A still further object is to provide new compositions of matter having rubber-like properties. Other objects will appear hereinafter.

These objects have been accomplished by the discovery that resilient, relatively non-plastic products having good resistance to the solvent and swelling action of oils can be prepared by vulcanizing polymers of furylethylene, i. e., heating in the presence of a small amount of sulfur, with or without additional compounding ingredients. The products thus produced resemble vulcanized natural rubber and the process of preparing them resembles the vulcanization of rubber.

The term "vulcanization" as herein employed refers to the process of reacting a polymer with sulfur. The product of vulcanization, known as a vulcanizate, is readily distinguishable from the original polymer by marked differences in physical properties. This process of vulcanization applied to polymers of furylethylene is that which is commonly employed in the treatment of natural rubber or rubber-like polymers or copolymers of butadiene hydrocarbons, and is sometimes referred to as "curing." As is well known, the vulcanization of rubber results in conversion of the polymer from a soft, plastic, and soluble state to one which is strong and elastic, essentially non-plastic and practically insoluble in aromatic hydrocarbon and chlorinated aliphatic hydrocarbon solvents; e. g., chloroform, trichloroethylene, benzene, toluene, xylene, etc. A similar, though somewhat less marked, change in physical properties occurs when polymers of furylethylene are vulcanized. Vulcanization of a polymer of furylethylene involves more than a simple conversion of a soluble composition to one that is insoluble. The latter transformation can involve merely exposure of the soluble polymer to air. Furthermore, the process of vulcanization according to this invention is applicable not only to polymers of furylethylene which are initially soluble but to those also which have become partly or completely insoluble as a result of oxidation.

The agents commonly known as accelerators which are usually employed in small amounts, e. g., 1–5% by weight based on the polymer, in admixture with sulfur to promote more rapid vulcanization of natural rubber or synthetic rubbers, can be used with similar effects in the vulcanization of furylethylene polymers. As examples of such agents there are mentioned mercaptothiazoles and tetra-alkylthiuramdisulfides, the latter being particularly effective. A wide variety of other agents, including zinc oxide, magnesium oxide or lead oxide (litharge), stearic acid, palmitic acid and the like, which serve to promote more rapid and satisfactory vulcanization of rubber when used in combination with sulfur and an accelerator of the above-mentioned type can likewise be employed as auxiliary agents in the vulcanization of furylethylene polymers.

Of the various polymers comprising furylethylene which can be employed, polyfurylethylene itself shows the greatest change in properties upon vulcanization. For example, a polyfurylethylene which has been plasticized with 15–30% of diethyl sebacate and then compounded with sulfur, zinc oxide, stearic acid and mercaptobenzothiazole, is a soft, pliable, and plastic material generally soluble in organic solvents and similar in appearance to compounded natural rubber before vulcanization. When such a composition is heated about 30 minutes at 145° C. it is converted to an insoluble vulcanizate which exhibits greater elasticity in addition to considerably improved tensile strength. Various fillers can be used in conjunction with the usual vulcanizing agents and of these carbon black is particularly preferred because of its marked strengthening and reinforcing effect upon the culcanizates. Thus, black stock vulcanizates of plasticized polyfurylethylene compositions are characterized by greater stiffness, much higher tensile strength, and better abrasion resistance than those containing other well known types of fillers.

The compounding of the polymers can be carried out readily on mills ordinarily used for compounding natural rubber at temperatures near their softening points, polyfurylethylene itself being readily worked at temperatures of 70–80° C. Plasticized polymers of furylethylene which more nearly resemble unvulcanized natural rubber can be worked and compounded like natural rubber at ordinary or only slightly elevated temperatures. Just as satisfactory, however, are the other well known compounding or mixing methods, such as the use of internal mixers. Satisfactory vulcanization of the compounded stocks is usually attained by heating for periods of 15–60 minutes at temperatures of 100–150° C. The exact conditions for carrying out the vulcanization will be dependent to some extent upon the original composition and the ultimate effect desired. To generalize, therefore, it can be said that polymers of furylethylene can be compounded and vulcanized using techniques in general similar to those employed with natural or synthetic rubbers.

The invention will be better understood by the following specific examples which are intended to serve as illustrations only and are not, therefore, to be construed as limiting the scope of the invention. Parts given are by weight.

EXAMPLE I

This example will illustrate the vulcanization of a polyfurylethylene/plasticizer composition.

Forty parts of pulverized polyfurylethylene, prepared by polymerization of furylethylene in a sodium oleate emulsion using ammonium persulfate as catalyst and stabilized prior to coagulation with 2% of an anti-oxidant consisting of a 55:45 mixture of phenyl alpha-naphthylamine and diphenylamine, are blended intimately with 10 parts of dibutyl sebacate on a warm, smooth mill, such as is ordinarily used in compounding natural rubber. A soft, pliable and coherent composition somewhat similar in general appearance to milled, unvulcanized natural rubber is obtained. It is sometimes found that this material is not readily soluble in butyl acetate or toluene in which the original polymer dissolves readily, but it is possible by maintaining a low mill temperature during the blending operation to obtain a soluble product. The solubility characteristics of the polymer compositions at this stage are of little importance insofar as the scope of this invention is concerned, however, for both soluble and insoluble polymers can be vulcanized to give improved products. The plasticized polymer, which in this case is difficultly soluble, is then compounded by four different formulae as indicated in Table I, wherein the components are given in parts by weight.

Table I

|  | I | II | III | IV |
|---|---|---|---|---|
| Plasticized polymer | 10.0 | 10.0 | 10.0 | 10.0 |
| Carbon black (Micronex) | | 5.0 | | 5.0 |
| Phenyl alpha-naphthylamine | 0.2 | 0.2 | 0.2 | 0.2 |
| Stearic acid | 0.2 | 0.2 | 0.2 | 0.2 |
| Sulfur | | | 0.2 | 0.2 |
| Tetramethyl thiuramdisulfide | | | 0.2 | 0.2 |
| Zinc oxide | 0.5 | 0.5 | 0.5 | 0.5 |

Each of the compounded stocks is heated in a mold for 30 minutes at 145° C. The tensile properties and general characteristics of the final products are given in Table II.

Table II

| | $T_B$ Tensile strength in lbs./sq. in. | $E_B$ Elongation (%) at break | Remarks |
|---|---|---|---|
| I | 200 | 360 | Dead, loggy, plastic and still millable. |
| II | 1,080 | 80 | Do. |
| III | 370 | 230 | More snappy and resilient product; relatively non-plastic. |
| IV | 1,700 | 120 | Do. |

Originally all four compositions are soft, plastic and loggy and exhibit poor tensile strength. Compositions I and II, which contain no sulfur (and no accelerator) and are therefore outside the scope of the present invention, undergo no significant changes in physical properties even upon prolonged heating. They are included only for comparison. When immersed in hot butyl acetate these stocks either dissolve or disintegrate completely. Compositions III and IV containing sulfur and tetramethyl thiuramdisulfide undergo vulcanization, however, giving relatively non-plastic products which can no longer be milled readily. These vulcanizates become tender when immersed in boiling butyl acetate but remain coherent nevertheless. The vulcanizates are much less thermoplastic than the uncured stocks and possess markedly improved tensile strengths. Moreover, they show much greater snap and elasticity, improved tear strength and superior abrasion resistance. It is particularly important to note the reinforcing or strengthening effect produced by carbon black. Thus, the black stock vulcanizates possess tensile strengths approximately five times as great as those of corresponding gum stocks. The vulcanizates show excellent resistance to oils or aliphatic hydrocarbons. For example, black stock vulcanizates of a 75% polyfurylethylene/25% diethyl sebacate blend exhibit practically no swelling when immersed for two days in kerosene at 100° C. or in gasoline at ordinary temperatures. Some stiffening of the vulcanizates occurs due to partial extraction of the plasticizer, but this can be minimized by the proper choice of plasticizer. The vulcanizates also exhibit excellent resistance to swelling in boiling water. The electrical properties of vulcanized polyfurylethylene compositions compare favorably with those of corresponding vulcanizates of 1,3-butadiene/styrene copolymers.

The properties of vulcanizates made according to the present invention will be dependent upon several factors, among which can be mentioned the initial polymer composition, the polymer/plasticizer ratio, and the particular polymer or plasticizer employed, the relative proportions of fillers and/or of vulcanization agents employed. In particular the specific vulcanization accelerator used as well as the temperature and period of cure will have a profound effect upon the final properties. To illustrate the effects of certain of these variables, the tensile strengths and elongations at break of a number of different polyfurylethylene vulcanizates are given in the following table. The various polymer/plasticizer blends are prepared as described above by mixing intimately on a mill such as ordinarily used in compounding rubber. In each case 10 parts of the plasticized polyfurylethylene composition is compounded with 5 parts of carbon black, 0.2 part of phenyl beta-naphthylamine, 0.2 part of stearic acid, 0.5 part of sulfur, 0.2 part of tetramethyl thiuramdisulfide and 0.5 part of zinc oxide. Vulcanization is then carried out by heating for periods of 10–30 minutes at 131–145° C. as indicated below.

Table III

| Plasticizer | Cure (min. at °C.) | $T_B$ Tensile strength in lbs./sq. in. | $E_B$ Elongation (%) at break |
|---|---|---|---|
| 30% butyl phthalyl glycolate | 15/131 | 910 | 150 |
| Do | 30/145 | 935 | 115 |
| 30% diphenyl-diphenyl oxide eutectic mixture | 15/131 | 1020 | 220 |
| Do | 30/145 | 1335 | 150 |
| 30% dibutyl phthalate | 15/131 | 655 | 170 |
| Do | 30/145 | 1000 | 130 |
| 20% diethyl sebacate | 10/131 | 1220 | 100 |
| Do | 30/145 | 1790 | 100 |

The stress strain properties are dependent to some extent also upon the particular vulcanization accelerator employed, not all agents producing as high a state of cure in a given period as the tetralkyl thiuramdisulfides. Thus, tetramethyl thiuramdisulfide exerts a greater accelerating effect than mercaptobenzothiazole which in turn is considerably more effective than a butyraldehyde-aniline condensation product.

EXAMPLE II

This example will illustrate the vulcanization of an oxidized, insoluble polyfurylethylene.

Ten parts of powdered polyfurylethylene which contains no antioxidant and which has been rendered insoluble by exposure to air are blended at 70–80° C. on a smooth mill, such as is used in compounding rubber, with one part of sulfur, 0.3 part of tetramethyl thiuramdisulfide, 0.3 part of stearic acid and 0.5 part of zinc oxide. The compounded polymer is quite brittle at 25° C. but softens and fuses readily at elevated temperatures. A portion of the compounded polymer is vulcanized by heating under pressure in a mold for 30 minutes at 145° C. A hard, black lustrous vulcanizate is obtained which is considerably tougher than a sample of the original polyfurylethylene molded under similar conditions in the absence of vulcanizing agents. The vulcanizate is less thermoplastic and much more resistant to swelling in organic solvents, such as toluene, butyl acetate or methyl ethyl ketone than the unvulcanized polymer.

EXAMPLE III

This example will illustrate the vulcanization of a soluble plasticized furylethylene/diethyl fumarate copolymer.

Twenty parts of a copolymer prepared by the emulsion polymerization of a 50% furylethylene/50% diethyl fumarate monomer mixture are blended on a mill, such as is used in compounding rubber, with 6 parts of diethyl sebacate. The resultant soft, rubber-like composition is readily soluble in butyl acetate. Twenty parts of this plasticized polymer are then compounded in the usual manner as follows:

| | Parts |
|---|---|
| Plasticizer/polymer blend | 20.0 |
| Phenyl beta-naphthylamine | 0.4 |
| Carbon black | 10.0 |
| Stearic acid | 0.4 |
| Sulfur | 0.4 |
| Mercaptobenzothiazole | 0.2 |
| Zinc oxide | 1.0 |

Upon heating the compounded stock for one hour at 145° C., it is converted to a pliable and somewhat elastic vulcanizate. The vulcanizate swells when immersed in hot butyl acetate but, unlike the original unvulcanized stock, it does not dissolve or disintegrate.

In the same manner a soluble, three-component copolymer obtained by the emulsion polymerization of a 50% furylethylene/40% diethyl fumarate/10% diallyl fumarate mixture can be converted to a somewhat rubber-like elastic vulcanizate which is completely insoluble in organic solvents.

EXAMPLE IV

This example illustrates the vulcanization of a diethyl sebacate-furylethylene/methyl methacrylate copolymer blend.

Twelve parts of a soluble copolymer obtained by polymerization of a 70% furylethylene/30% methyl methacrylate mixture in a 10% sodium oleate emulsion are blended thoroughly with 4 parts of diethyl sebacate to give a soft, pliable, and homogeneous composition. Ten parts of this plasticized polymer are compounded as indicated by formula IV of Example I except that instead of 0.2 part sulfur, 0.3 part sulfur is used. The compounded polymer is quite loggy, soft, and thermoplastic and disintegrates rapidly when immersed in boiling butyl acetate. Upon heating in a mold for 30 minutes at 145° C. a vulcanizate is obtained which shows no tendency to disintegrate or dissolve when placed in hot butyl acetate. The vulcanizate is much tougher, stronger and less thermoplastic than the original polymer although its tensile strength (570 lbs./sq. in. at 140% elongation) is considerably lower than that of corresponding vulcanizates of plasticized polyfurylethylene (Example I).

It will be apparent that there are many modifications and equivalents of the foregoing examples which are within the broad scope of this invention. For example, there are, of course, many different polymers of furylethylene to which the invention is applicable, the invention being applicable not only to the vulcanization of the polyfurylethylene itself, which is made by polymerizing furylethylene in the absence of other polymerizable materials, but also to the vulcanization of any polymer obtained by polymerizing furylethylene with one or more other polymerizable vinylidene compound containing only one ethylenic (C=C) linkage. As specific examples of other furylethylene polymers which may be vulcanized to give new and valuable compositions of matter there may be mentioned copolymers with such vinyl and vinylidene compounds as acrylic acid, alpha-methylacrylic acid, alpha-chloroacrylic acid, beta-cyanoacrylic acid, esters of acrylic and substituted acrylic acids, such as methyl acrylate, ethyl acrylate, butyl acrylate, methyl methacrylate, ethyl methacrylate, octyl methacrylate, methyl (alpha-chloro)acrylate, butyl (alpha-chloro)acrylate, etc., acrylyl and methacrylyl chlorides, acrylic and methacrylic acid amides, acrylonitrile, methacrylonitrile, fumaric acid esters, such as dimethyl or diethyl fumarate, fumaric acid dinitrile, styrene and vinyl naphthalene, vinyl chloride, vinylidene chloride, vinyl esters such as vinyl formate, vinyl acetate, vinyl propionate, or vinyl benzoate, N-vinyl carbazole, N-vinyl pyrrole, N-vinyl amides, e. g., N-vinyl phthalimide, N-vinyl maleimide, etc. The most pronounced effects produced by vulcanization will be obtained with those copolymers in which furylethylene is present as the major constituent and for this reason copolymers in which 50% or more of the total weight is furylethylene are preferred. Copolymers containing lesser amounts of furylethylene are by no means excluded from the scope of this invention since the advantages in properties of their vulcanizates are observed in polymers containing as little as 5% furylethylene. The polymers and copolymers can be prepared either in bulk, in solution in organic solvents, or more preferably still, in aqueous emulsion. The latter method in general results in more rapid polymerization and gives products of higher molecular weight in a form which is most suitable for compounding with plasticizers, fillers, and vulcanizing agents. Generally, the emulsion polymerization can be readily effected using a 10% sodium oleate solution as the aqueous phase and ammonium or potassium persulfate as catalyst. However, other emulsifying agents known in the art of emulsion polymerization are suitable.

As illustrated by specific examples, the polymeric compositions subjected to vulcanization can contain in addition to the actual vulcanizing agents such as sulfur, zinc oxide, accelerator, etc. other materials such as various softeners or plasticizers and/or fillers. The properties of the vulcanizates can be varied at will depending on the particular use for which the product is desired. For many applications, such as in coating compositions of various sorts, good flexibility, resiliency, and even elasticity is desirable, and to obtain such properties in vulcanizates of furylethylene polymers, it is usually necessary to include from 5 to 50%, on the weight of the composition, of softener or plasticizer in the original compounded stock. There are various agents which can be employed for this purpose, among which esters of phthalic, tartaric, and sebacic acids, such as diethyl-, dipropyl-, or dibutylphthalate, tartrate, or sebacate are particularly suitable. Other high boiling materials which can be employed satisfactorily as plasticizers include n-butyl salicylamide, tricresyl phosphate, mixtures of o-, m-, and p-toluene sulfonamides, butyl phthalylglycolate, diphenyl/diphenyl oxide mixtures, dibutylCellosolve tartrate, drying oils and semi-drying oils such as linseed oil, soybean oil, castor oil, and the like. Various natural or synthetic resins having film-forming properties can be employed likewise. The amount and type of plasticizer or softener used will be dependent upon the properties of the particular polymer itself as well as the purpose for which the final vulcanizate is to be employed. Fillers of various types can also be employed. These include other natural or synthetic resins such as wood flour, lignin, cellulose acetate, rosin, phenol-formaldehyde resins, urea-formaldehyde resins, polyvinyl acetate, polyvinyl alcohol, polyvinyl chloride, polystyrene, polymethylmethacrylate, and the like; also, various inorganic compounds such as magnesium oxide, titanium oxide, lead oxide, zinc oxide, antimony oxide, antimony pentasulfide, arsenic trisulfide, calcium oxide, etc.

Carbon black in its various forms as employed in the compounding of natural or synthetic rubbers is particularly preferred as a compounding ingredient for furylethylene polymers, especially plasticized furylethylene polymers. In fact, carbon black exerts a pronounced reinforcing and strengthening action even upon unvulcanized polyfurylethylene compositions. Improvement in tensile strength in vulcanizates is even more marked. The moduli of the vulcanizates are also improved. The relative proportions of compounding ingredients in relation to polymer and other ingredients in the compounded stocks can be varied over wide limits and obviously the properties of the final vulcanizates will vary accordingly.

The actual chemical or physical-chemical process involved in the vulcanization of furylethylene polymers is not known. Nevertheless, it is perhaps significant to note that these polymers can be vulcanized using essentially the same agents and the same techniques as are generally employed in the vulcanization of natural rubber or synthetic rubbers based on polymers of butadiene-1,3. While heat treatment of the polymer in the presence of sulfur alone will result ultimately in vulcanization, it is usually advantageous to employ in addition to sulfur certain auxiliary agents to promote more rapid and complete vulcanization. Such agents as are commonly employed with natural rubber for this purpose are suited. Particularly preferred are accelerators of the tetralkyl thiuramdisulfide type such as tetramethyl or tetraethyl thiuramdisulfide, and the thiazoles such as 2-mercaptothiazole or 2-mercaptobenzothiazole. Other agents which can be employed include organic bases such as amine-aldehyde condensation products, for example, butyraldehyde-aniline, xanthates such as zinc butyl xanthate, thiuramtetrasulfides, dithiocarbamates such as zinc dimethyl dithiocarbamate and hexamethyleneammonium hexamethylenedithiocarbamate, substituted guanidines such as di-o-tolyl guanidine, and substituted thioureas such as diphenyl thiourea. Relatively small proportions of such agents such as 0.5–5% by weight based on the polymer are usually sufficient. The accelerating action of such agents can be enhanced still further in many instances when there are included also in the compounding formulae small amounts, for example 1–10% of certain inorganic acids. Preferred agents of the latter types are zinc oxide, magnesium oxide, litharge, or calcium oxide and oleic, palmitic, or stearic acids and the like. Inorganic materials such as oxides of the above types can be used as fillers and, in such instances, it is desirable to use these agents in relatively large proportions. The amounts of such agents to be employed as accelerators of vulcanization will, of course, depend to some extent upon the proportions of sulfur used, the temperature and period of cure, the particular polymer or copolymer to be vulcanized, and the state of cure desired.

Only relatively small amounts of sulfur are required to cause vulcanization of furylethylene polymers, especially when it is used in combination with the aforementioned auxiliary agents. It will usually be necessary to determine by trial the preferred polymer/sulfur ratio in accordance with the amount of other compounding agents employed and the results desired. Generally, 1–5% by weight of sulfur based on the polymer will be found satisfactory and this range is preferred, but the invention is not restricted to such limits. The preferred temperature and period of cure will likewise vary greatly. In most instances, using compounding formulae similar to those set forth in the examples, optimum cures will be obtained in 15–120 minutes at temperatures of 100–150° C., although temperatures and heating periods above or below these limits will in many cases give satisfactory vulcanizates. As in the curing of natural or synthetic rubber, the preferred temperature and period of cure will vary depending upon the actual polymer and compounding ingredients used and the results desired.

While for most purposes the simplest and most economical method of vulcanization of furylethylene polymers will involve compounding with sulfur itself, followed by heat treatment, there are other more or less indirect means of carrying out the reaction. Vulcanization can be carried out by exposing the polymer composition to sulfur chloride fumes, for example. This method is particularly useful in the preparation of relatively thin vulcanized films of the polymers, or to obtain a surface hardening effect with articles of any dimension. A still further method involves treatment of the polymers with hydrogen sulfide and sulfur dioxide.

It will be apparent that there is a wide selection of applications for which the vulcanizates of furylethylene polymers are well suited. The unplasticized compounded stocks can be molded into objects of various shapes and then vulcanized by heat treatment to give articles of improved toughness and hardness. In view of their insoluble nature and markedly improved resistance to swelling in organic solvents, such vulcanized articles offer many advantages over the original unvulcanized polymers which are either soluble in organic solvents or readily swelled. Furthermore, the vulcanizates are considerably more heat-stable and therefore retain their shape better at elevated temperatures. The compounded stocks can be dissolved or dispersed in organic solvents and applied therefrom as coating compositions to various articles, the coating thereafter being given a heat treatment to cause vulcanization. Vulcanizates of plasticized polymers are likewise suited for many applications, as for example, in protective coatings on wood, concrete, metal, and textiles or fabrics of various sorts. Since vulcanizates of plasticized polyfurylethylene exhibit good electrical resistance they are particularly well suited as wire coating materials. The plasticized polymeric compositions can be applied prior to vulcanization from solution and as emulsions or dispersions in water and organic solvents, or if desired, they can be extruded in any desired manner.

It is apparent that many widely different embodiments of this invention may be made without departing from the spirit and scope thereof, and, therefore, it is not intended to be limited except as indicated in the appended claims.

I claim:

1. A sulfur vulcanized furylethylene polymer, said furylethylene polymer being of the class consisting of polyfurylethylene, and copolymers of furylethylene and a vinylidene compound having only one ethylenic linkage, said copolymer comprising at least 50% furylethylene.

2. A sulfur vulcanized plasticized furylethylene polymer, said furylethylene polymer being of the class consisting of polyfurylethylene, and copolymers of furylethylene and a vinylidene compound having only one ethylenic linkage, said copolymer comprising at least 50% furylethylene.

3. A sulfur vulcanized composition comprising a plasticized furylethylene polymer and carbon black, said furylethylene polymer being of the class consisting of polyfurylethylene, and copolymers of furylethylene and a vinylidene compound having only one ethylenic linkage, said copolymer comprising at least 50% furylethylene.

4. A sulfur vulcanized composition comprising a furylethylene polymer plasticized with a sebacic ester and reinforced with carbon black, said furylethylene polymer being of the class consisting of polyfurylethylene, and copolymers of furylethylene and a vinylidene compound having only one ethylenic linkage, said copolymer comprising at least 50% furylethylene.

5. A sulfur vulcanized polyfurylethylene.

6. A sulfur vulcanized plasticized polyfurylethylene.

7. A sulfur vulcanized composition comprising polyfurylethylene plasticized with a sebacic ester and reinforced with carbon black.

8. A sulfur vulcanized copolymer of furylethylene and a vinylidene compound having only one ethylenic linkage, the said copolymer comprising at least 50% furylethylene.

CHARLES J. MIGHTON.